(12) United States Patent
Welk et al.

(10) Patent No.: US 7,598,697 B2
(45) Date of Patent: Oct. 6, 2009

(54) ELECTRIC MOTOR AND A METHOD THEREFOR

(75) Inventors: Christian Welk, Illtertissen (DE); Michael Apel, Esslingen (DE); Ralf Hartramph, Albershausen (DE)

(73) Assignee: Festo AG & Co., Esslingen (DE)

( * ) Notice: Subject to any disclaimer, the term of this patent is extended or adjusted under 35 U.S.C. 154(b) by 293 days.

(21) Appl. No.: 11/821,896

(22) Filed: Jun. 26, 2007

(65) Prior Publication Data

US 2008/0042610 A1 Feb. 21, 2008

(30) Foreign Application Priority Data

Jul. 7, 2006 (DE) .................. 10 2006 031 453

(51) Int. Cl.
*G05B 11/00* (2006.01)
(52) U.S. Cl. ................. 318/686; 318/671; 318/592; 310/15; 310/12; 310/36; 310/40 R; 700/63
(58) Field of Classification Search ................. 318/686, 318/671, 592; 310/15, 12, 36, 40 R; 700/63
See application file for complete search history.

(56) References Cited

U.S. PATENT DOCUMENTS

| | | | | | |
|---|---|---|---|---|---|
| 3,727,121 | A | * | 4/1973 | Rich | 318/696 |
| 4,710,691 | A | * | 12/1987 | Bergstrom et al. | 318/696 |
| 4,731,572 | A | * | 3/1988 | Bolie | 318/721 |
| 4,873,478 | A | * | 10/1989 | Weiss | 318/779 |
| 4,888,543 | A | | 12/1989 | Bleijenberg | |

(Continued)

FOREIGN PATENT DOCUMENTS

DE 10315754 A1 10/2004

OTHER PUBLICATIONS

Doo-Hee Jung and In-Joong Ha: "An Efficient Method for Identifying the Initial Position of a PMSM with an Incremental Encoder", IEEE Transactions on Industrial Electronics, vol. 45, Issue 4, pp. 682-685 (Aug. 1998).

*Primary Examiner*—Rita Leykin
(74) *Attorney, Agent, or Firm*—Hoffmann & Baron, LLP (57) ABSTRACT

A motor and a method for serves finding the position of an armature in relation to a stator of the motor. In the method and the motor the armature is driven by an exciting field which is produced by exciting windings of the stator, and the armature is caused by the exciting field to perform an oscillatory motion, whose progression is detected by a position measuring means for measuring positions of the armature and is evaluated to determine the relative position, with the steps of:

- designation of a target value signal, applicable for a target oscillation, to a commutation means for current flow in the exciting windings;
- modification of a designating commutation offset value in the commutation means within a value range essentially corresponding to the distance between the two adjacent poles of the armature, the designating commutation offset value defining an assumed relative position with reference to at least one exciting winding of the stator;
- causing flow of current through the exciting windings on the basis of the respective designating commutation offset value and of the target value signal so that the armature is driven to perform a oscillatory motion corresponding to the target oscillation; and
- finding at least one actual commutation offset value in the case of which the oscillation amplitude of the oscillation motion is at its maximum.

20 Claims, 4 Drawing Sheets

U.S. PATENT DOCUMENTS 5,426,354 A * 6/1995 Bausch .................. 318/400.04
5,651,068 A * 7/1997 Klemba et al. .............. 713/159
5,739,659 A * 4/1998 Ezuka ........................ 318/605
5,811,949 A * 9/1998 Garces ....................... 318/448
6,388,416 B1 * 5/2002 Nakatani et al. ............ 318/700

* cited by examiner

ELECTRIC MOTOR AND A METHOD THEREFOR

CROSS-REFERENCE TO RELATED APPLICATION

This application claims priority based on German Patent Application No. 10 2006 031 453.0 filed on Jul. 7, 2006, which is incorporated herein by reference.

BACKGROUND OF THE INVENTION

1. Field of the Invention

The invention relates to an electric motor and a method for finding the position of an armature in relation to a stator of the motor, in the case of which the armature is driven by an exciting field which is produced by exciting windings of the stator, and the armature is caused by the exciting field to perform an oscillatory motion, whose progression is detected by a position measuring means for measuring positions of the armature and is evaluated to determine the relative position.

2. Description of the Related Art

Such a method is for example described in the German patent publication DE 103 15 754 A1. In the known method which is for example applicable to rotary drives, a phase relationship between the current serving for production of the exciting field and mechanical oscillations of the armature, is evaluated. The correlation results in a measure for the relative position of the armature to the stator. Between the oscillations, which are produced by the current, and the oscillation response of the armature however undesired phase differences may occur, as for example owing to the effects of friction, loads coupled with the armature and the like, which influence the oscillation characteristics. Accordingly there are errors in measurement. The position of the armature in relation to stator can not be correctly found.

A knowledge of the position of the armature in relation to stator is however essential for effective operation of the motor. On the basis of a correctly found relative position the respective motor will operate in an optimum fashion. The relative position, which in the case of a linear motor is a linear distance between the armature and the poles of the exciting field, and in the case of a rotary motor is an angle between the poles of the armature and of the exciting field, corresponds to a commutation effect, which is employed for the supply of current to the exciting windings. When for instance a constant but incorrect commutation offset between the armature and the stator is taken as a basis, the power output of the motor will be reduced.

SUMMARY OF THE INVENTION

One object of the invention is thus to provide a method and a motor for determination of the commutation offset or of the relative position of the armature to the stator.

In order to achieve position object, on the basis of the initially mentioned method the invention provides the following steps:

designation of a target value signal, applying for an oscillation, to a commutation means for current flow in the exciting windings, modification of a designating commutation offset value in the commutation means within a value range essentially corresponding to the distance between two adjacent poles of the armature, the designating commutation offset value defining an assumed relative position with reference to at least one exciting winding of the stator, causing flow of current through the exciting windings on the basis of the respective designating commutation offset value and of the target value signal so that the armature is driven to perform an oscillatory motion corresponding to the target oscillation, and finding at least one true or actual commutation offset value in the case of which the oscillation amplitude of the oscillation motion is near its maximum.

Furthermore a motor in accordance with an independent claim is provided embodying technical principle of the invention.

The method of the invention may be implemented in the case of electrical linear motors and rotary drives, more particularly synchronous motor or in the case of combined linear/rotary drives.

The motor is for example a motor with electronic commutation. Preferably the invention is employed in the field of so-called hybrid drives, in the case of which the motor is coupled with a pneumatic drive, which are best simultaneously or sequentially operated.

The armature can be a permanently excited or an electrically excited armature. The armature will preferably comprise a plurality of magnetic poles, which are arranged sequentially and in a correlated fashion with the arrangement of the exciting windings linearly or circularly adjacent to each other.

The designating commutation offset value corresponds to the an assumed position of one pole of the stator in relation to at least one exciting winding. This relative position is still unknown at the start of measurement, for example when the position measuring means comprises an incremental displacement measurement system. The designating commutation offset value is varied in order to find the true or actual relative position or, respectively, the true or actual commutation offset value. In this respect it is an advantage to run through a value range, which corresponds to the distance apart of two adjacent magnetically identical poles or counter poles of the armature. In principle it is unnecessary to vary the commutation offset, which may also be termed the commutation angle in the case of a rotary drive, over two pole divisions of the armature. Even on the basis of the distance of one pole division, i. e. within the distance apart of two adjacent magnetic counter poles of the armature, it is possible with the method in accordance with the invention to find the commutation offset or the commutation angle.

It will be clear that a minor value range, f. i. by a comparison of the oscillation amplitude of the oscillatory movement of the rotor with a correlation function, may in itself be sufficient to find the true or actual relative position of the armature in relation to the stator and accordingly the actual commutation offset value. A smaller value range may for example be equal to the half the distance between two adjacent counter poles of the armature. Normally a larger value range will improve the accuracy of measurement.

Determination of the actual commutation offset value may take place parallel to the production of the oscillation movement or, respectively, running through the value range of the commutation offset or only when an essentially complete set of measurements for the oscillation movement is to hand.

The armature only moves a little during oscillations. However, it is convenient for the armature to be movable at least in one direction of motion. When it strikes a hindrance in the other direction of motion, this will not be a hindrance in the performance of the method.

The target value signal may for example be applied as a sine function. However it will be clear that in principle other forms of oscillation are possible. It is possible for the armature to be acted upon by a sine signal or by a cosine signal. It would also conceivable for the target value signal to define, for example, a target oscillation movement and accordingly to be a target position signal for an oscillation movement.

The commutation offset or commutation angle is best incremented within the value range continuously. The change in such increment is however substantially slower than a frequency of the target value signal, f. i. of the sine signal and preferably substantially slower. Accordingly the influence of the changed value range is small as regards the commutation offset on the oscillation movement.

Furthermore the amplitude of the oscillation movement is comparatively small. It is best made substantially smaller than the distance apart of two adjacent armature poles. For instance the ratio of the distance apart of two adjacent armature poles to the amplitude of the oscillation movement may be 1000 to 1 or 10000 to 1. In the case of a practical working example a distance apart of 3000 to 1 has turned out to be advantageous.

The frequency and/or the amplitude of the target oscillation are preferably changed, for example within at least two consecutively following test runs. Accordingly an adaptation to the real load conditions of the motor in the installed state may be effected. For instance the motor may be in an oblique position or may already have a load connected with its armature. By changing the load and/or the amplitude of the target oscillation it is possible to adapt to the real load conditions and furthermore to make possible an optimum determination of the commutation offset value even in the case of changed loading conditions. For instance as from a defined starting frequency value, which is defined by the intrinsic mass of the armature, the frequency will be reduce. When for example the armature is moving a load or, respectively, when a load is located on the armature, the system as a whole will be more sluggish so that the reduction in the frequency will render possible a higher precision of measurement. Starting with the intrinsic mass of the armature it is also convenient to increase the amplitude. This is more particularly expedient in the case of major loads which may be located on the armature. It will be apparent that in the case of an unloaded armature as well the change in the frequency and/or the amplitude of the target oscillation will step up the accuracy of measurement.

The true or actual commutation offset value will expediently found on the basis of a comparison of the amplitude of the oscillation movement with a correlation function. The correlation function will for example be a theoretically derived function. It is also conceivable to store, for example in a memory of a control means of the motor, an amplitude progression obtained under optimum conditions of measurement, as a correlation function.

The designating commutation offset values are preferably found on the basis of the position values of the position measuring means. For instance a starting designating commutation value will be a randomly selected designating commutation offset value. It is nevertheless conceivable that a position value, which is found by the position measuring means finds at any position at the start of measurements, could constitute the starting designating commutation offset value. The designating commutation offset value will for example be determined by incrementally increasing position values provided by the position measuring means, for example starting at a position value at the beginning of measurements.

It is possible, owing to the influence of the surroundings, for the armature to perform a movement modulating the oscillation movement which is produced for measurement purposes. This modulated movement may for example be caused by an oblique position of installation of the motor, in the case of which the armature runs out of control. An attached load can also cause a modulated movement. It is for example conceivable for the armature movement to become uncontrolled owing to the measurement oscillation movement and to drive itself. The modulation influence values may for example be found as floating mean values and subtracted from position values representing the combined modulation function and the measurement oscillation function.

It is an advantage to monitor and to limit one movement stroke or one rotary movement of the motor during the measurement, for example using a regulation of angle. Accordingly undesired movement strokes or, respectively, rotary movement angles are avoided, which for example might lead to damage to means fitted to the motor or fitted adjacent to the motor.

A regulation of angle or a position regulation means may also be employed with advantage for a further purpose:

The at least one actual commutation offset value may be ambiguous. In the case of a simple and a double pole division distance there is namely in each case a maximum movement amplitude as regards finding the at least one actual commutation offset value. Now it is best to supply one of the actual commutation offset values to an angle or position regulation means in order to perform a test. The position regulation means will then comprise the actual commutation offset value as a first actual commutation offset value or test commutation offset value. The position regulation means will regulate the position of the armature in relation to the stator on the basis of the test commutation offset value. If the armature remains in its current position, the selected actual commutation offset value will be the correct actual commutation offset value.

It is nevertheless also possible owing to the above mentioned ambiguity for the "false" actual commutation offset value to be transmitted to the position regulator. The regulator will then so regulate, for example, the armature that it is shifted with a maximum force out of its target position. Then the test commutation offset value or, respectively, the first actual commutation offset value will be increased by a value corresponding to the distance apart of two adjacent magnetically identical poles of the armature or the distance apart of two adjacent magnetically opposite poles of the armature.

In the case of the above mentioned test operation a limitation is preferable, that is to say in the case of the test operation mentioned supra a maximum movement stroke is advantageously permitted which is best substantially smaller than the distance apart of two adjacent armature poles so that the armature cannot in the test run cause any damage to attached loads or other structures in the surroundings of the motor.

It is moreover an advantage to perform some test movements along a predetermined test movement path after putting the motor into operation in order to verify the values found.

Further advantageous developments and convenient forms of the invention will be understood from the following detailed descriptive disclosure of one embodiment thereof in conjunction with the accompanying drawings.

DETAILED DESCRIPTION OF THE PREFERRED EMBODIMENTS

Figure 1:
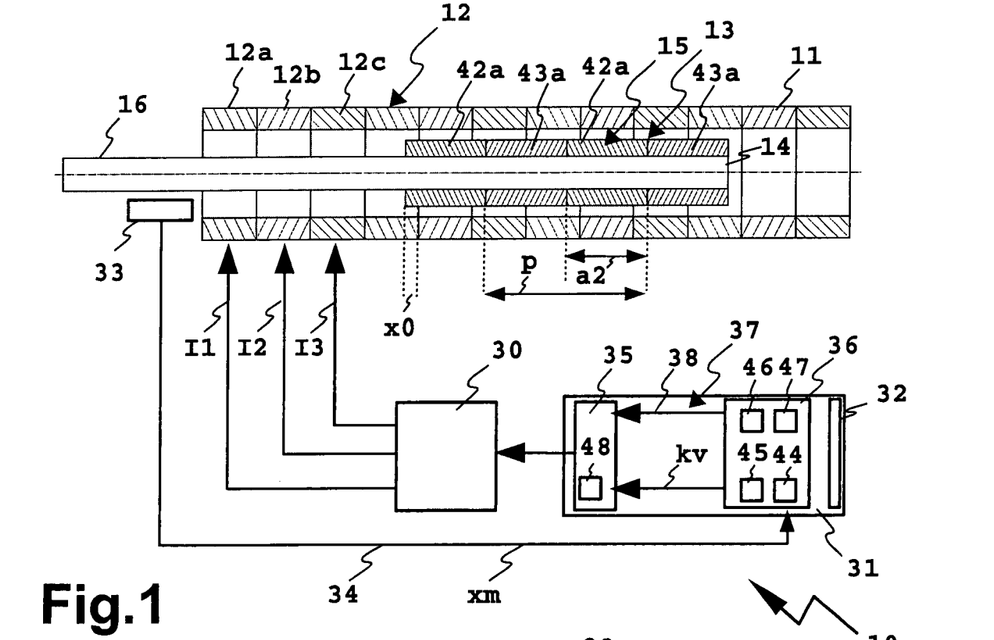
FIG. 1 shows a diagrammatic circuit diagram with a diagrammatic cross section of a motor for an explanation of the method.
Figure 2:
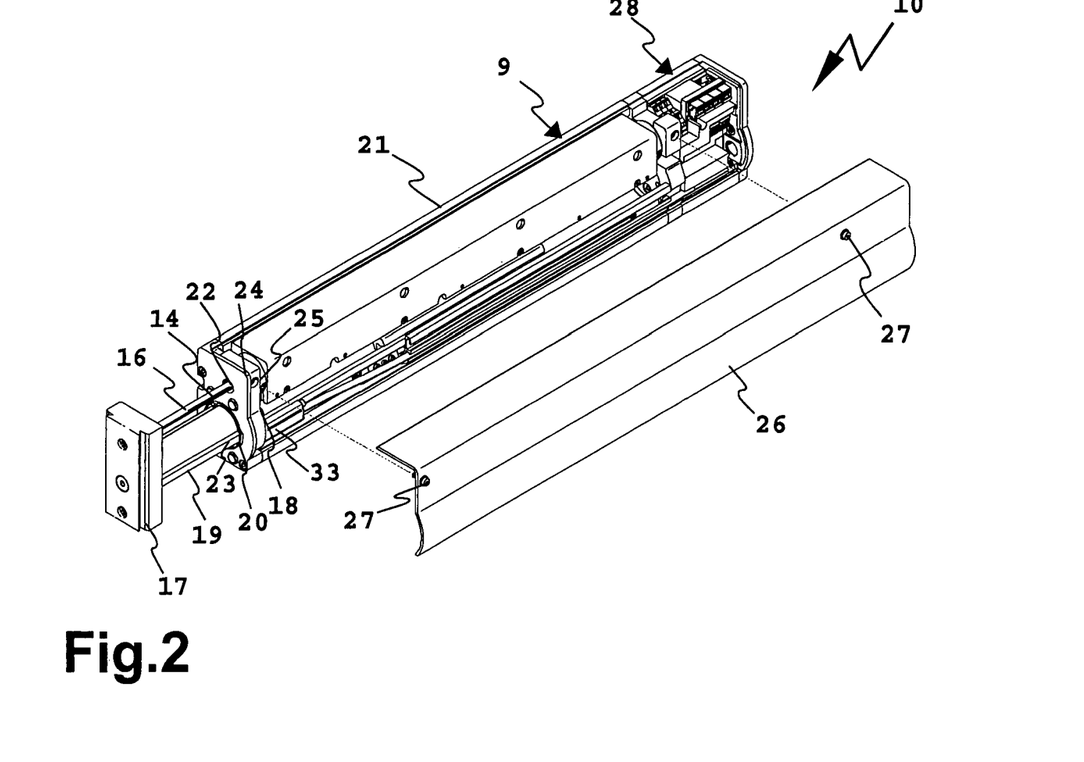
FIG. 2 is a perspective elevation of the motor in accordance with FIG. 1 with the housing open.

A positioning drive 9, as for example a handling drive or a so-called robotics axle, comprises an electrical linear motor 10 with a stator 11, whose exciting windings 12 produce an exciting field 13 for driving an armature 14. The motor 10 is a synchronous motor. The motor 10 constitutes a linear drive for example. The armature comprises a permanent magnet arrangement 15 arranged on a armature rod 16. In lieu of the permanent magnet arrangement 15 an electrical coil arrangement could be provided for producing a magnetic field.

At the front end of the armature rod 16 there is a power output element 17, for example plate having mounting holes for the attachment of objects to be shifted, which are not represented in the figure. The power or force output element 17 is able to be driven linearly with the armature. Preferably at least adjacent to an end wall 25 the armature rod 16 is guided on a housing 21 of the motor 10.

The force output element 17 for this purpose runs on a guide 18 with a rod-like guide element running in a guide socket 20 in the housing 21 in a linear manner. The guide element 19 and the armature rod 16 extend in parallelism to one another in the housing 21. At the front end of the guide element 19 and of the armature rod 16 the force output element 17 is arranged. The armature rod 16 and the guide element 19 extend through openings 22 and 23 at an end side 24 of the housing 21. The walls 26 of the housing 21 are preferably detachably connected, for example by means of screws 27 so that in the interior of the housing 2, components described in the following are accessible in the interior of the housing 21 for servicing purposes.

The exciting field 13 is produced by means of a commutation means 30 controlled by a control means 31 and such means 30 produces currents I1 through I3 for the exciting windings 12. The control means 31 may constitute a component of the commutation means 30. The means 30 and 31 are for example arranged in a rear section 28 of the housing 21 and can be controlled by way of a wired or wireless interface 32 by a master control (not illustrated) for positioning tasks. It will be clear that the positioning drive 9 may also be a self-contained assembly with local logic control circuitry.

An incremental position measuring means 33 detects the respective positions of the armature 14 and transmits position values 34 to the control means 31. The position measuring means may constitute a component of the control means 31 or of the commutation means 30.

Figure 3:
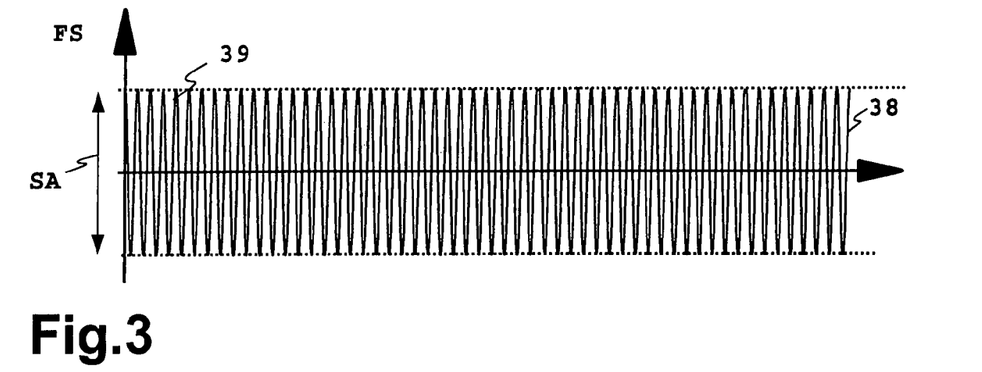
FIG. 3 shows a target force progression in an oscillation movement, which is to perform a position regulation of the motor in accordance with FIG. 1 in the method in accordance with the invention.

A designation means 36, for example a controller, of the control means 31, provides designation values for the position regulation means 35. For example, the designation means 36 may designate a target force 38 as a target value signal 39. The target force 38 has a sinusoidal progression (see FIG. 3). One amplitude SA of the target value signal 39 is substantially smaller than the distance p apart of magnetically identical poles 42a and 42b of the permanent magnet arrangement 15 of the armature 14. The distance p apart of the magnetically identical poles 42a and 42b, for example between north and south poles, will for example amount to 30 mm and the amplitude SA for example 10 to 20 microns. The amplitude SA is substantially smaller than a distance a2 or respectively p/2 between two consecutively following magnetically identical poles, for example 42a and 43a or 42b and 43b.

The supply of the target value signal 39 to the position regulation means 35 serves, during the putting into operation of the motor 10, to find the relative position x of the armature 14 as regards the stator 11 or, respectively, the poles 42a and 42b and also 43a and 43b as regards the exciting windings 12 and, respectively, their wires 12a, 12b and 12c. This relative position x correlates with a actual commutation offset value ki1 and is equal to this actual commutation offset value ki1. The relative position x0 of the armature 14 and accordingly the actual commutation offset value ki1 is however not yet known on putting the motor into operation.

For finding the actual commutation offset value ki1 different designating commutation offset values kv are, as it were, rehearsed. The designating commutation offset values kv are varied in a value range w, which corresponds to the distance p apart of two magnetically identical poles 42a and 42b or 43a and 43b of the armature 14. A value range w would for example also suffice which is equal to the distance p apart of two magnetically opposite poles 42a and 43a.

The designation means 36 has for example an incremental counter 44, which in a value range of n=0 to a final value ne=ne, for example 10000, increments offset values off respectively by an increment of 0.003 mm so that a linear progression of offset values off results.

Figure 4A:
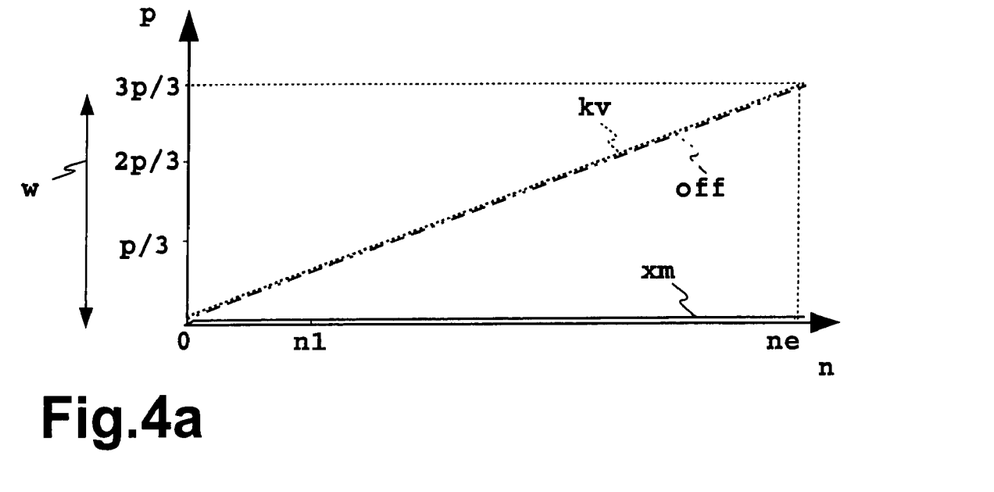
FIG. 4a shows progressions of a designating commutation offset value for position regulation and also its basic position values of the position measuring means and furthermore of an offset value.

The offset values off, for forming the designating commutation offset values kv, are added to the position values xm, which are formed on the basis of the position values 34 or are equal to the position values 34. Accordingly the designating commutation offset values kv become larger on each incrementing step n by 0.003 mm, for example in accordance with the following formulas:

$n: kv(n)=xm(n)+\text{off}(n)$ $n=1: kv(n=1)=xm(n=1)+0.003 \text{ mm}$ $n=2: kv(n=2)=xm(n=2)+0.006 \text{ mm}$ $n=3: kv(n=3)=xm(n=3)+0.009 \text{ mm}$ In FIG. 4a a test progression is illustrated in which no external influences acted on the armature 14. The armature accordingly dwelled essentially in the same position, i.e. the position values xm represent an essentially constant position of the armature 14 in relation to the stator 11 so that the designating commutation offset values kv also represent a linear progression.

Figure 4B:
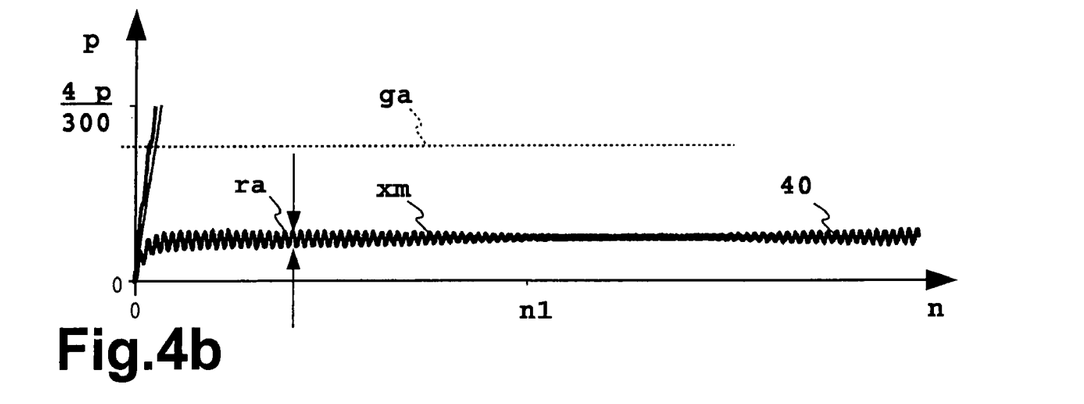
FIG. 4b is a view on a larger scale of part of the structure illustrated in FIG. 4a wherein the oscillating progression of the position values is indicated.

In the detailed view of FIG. 4b it does however become clear that the position values xm represent an oscillation movement 40. The resulting amplitude ra of the oscillation movement 40 is for example smaller in a counter value n1 than at zero or at larger counter values n.

Figure 5:
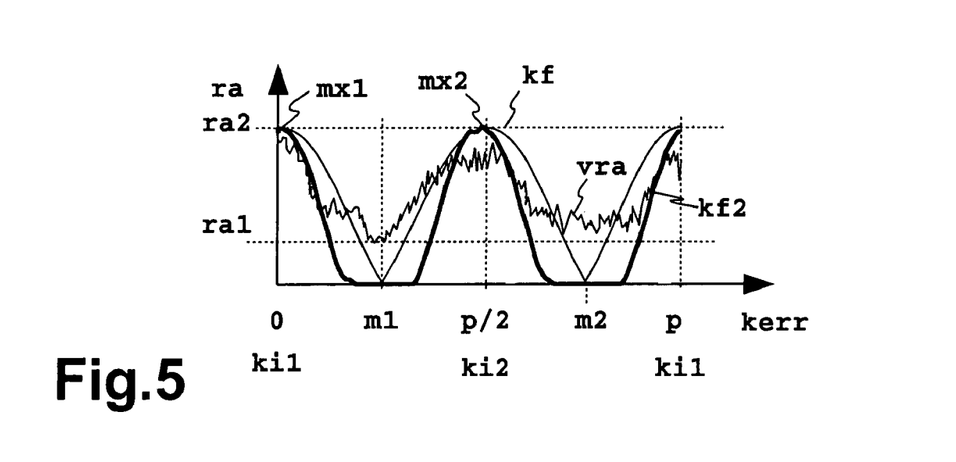
FIG. 5 shows a measured amplitude progression and a correlation function.

A progression vra of the amplitude of the oscillation movement of the armature 14, which for example varies between a bottom and a top value ra1 and ra2, is utilized to find the actual commutation offset value ki1 or ki2.

An analysis means 45, for example a program, whose program code is held in a memory 47 and is implemented by a processor 46 of the control means 31, compares the progression vra with a correlation function kf.

The correlation function kf represent a theoretical progression of a commutation offset error kerr, which for example has a minimum at m1 and m2 and at zero p/2 and p respectively has a maximum mx1 and mx2. In the case of the commutation actual values ki1 and ki2 the progression vra of the oscillation movement 40 is mx1 and mx2 at its maximums. The values zero and p of the commutation offset error kerr correspond for example to a first actual commutation offset value ki1 and the commutation offset error value kerr=p/2 corresponds to a second actual commutation offset value ki2.

The analysis means 45 can compare the progression vra also with a correlation function kf2, which f. i. corresponds to a simulated amplitude progression. In the case of the minimums ml and m2 the correlation function kf2 has horizontal sections due to frictional effect, f. i. stiction or dynamic friction of the armature 14 and/or the guide 18.

To determine which of the two actual commutation offset values ki1 and ki2, which differ by p/2 from each other, is the "correct" actual commutation offset value, the control means 31 subjects the position regulation means 35 by trial and error firstly to the actual commutation offset value ki1. If the position regulation means 35 is in a position on the basis of the actual commutation offset value ki1 to hold the armature 14 at essentially the same position, the actual commutation offset value ki1 will henceforth be utilized by the position regulation means 35 or angle regulation means for positioning the armature 14. However, when the armature 14 has moved on farther a certain distance and when on the basis of the actual commutation offset value ki1 is position-regulated, the control means 31 will select f. i. the actual commutation offset value ki2 or will increase the actual commutation offset value ki2 by half the distance p/2 apart of two magnetically identical poles 42a and 42b, something which is equal to the distance a2 apart of two magnetically unlike poles 42a and 43a or 42b and 43b.

Figure 7:
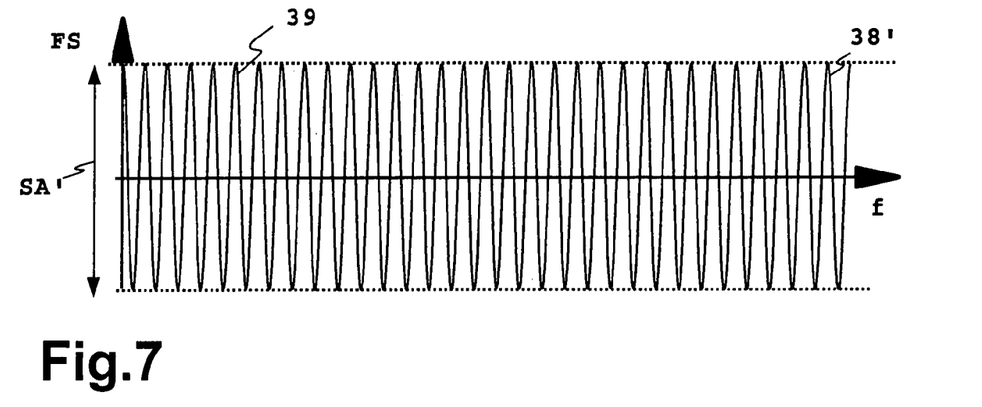
FIG. 7 shows a target force progression in accordance with FIG. 3 with a changed amplitude and frequency.

It is possible for the armature to be affected by external influences, as for example a connected load or the like. In such cases it is convenient for the control means 31 to vary a frequency f and/or an amplitude of the target value signal 39. The frequency of the target force 38 corresponds f. i. to a starting frequency. The amplitude SA of the target force 38 corresponds to a starting amplitude. When armature 14 for example has a major mass, f. i. owing to a load coupled with it, the control means will increase f. i. the amplitude SA to be an amplitude SA' and/or will reduce the oscillation frequency of the target value signal 39 (see FIG. 7).

Figure 6:
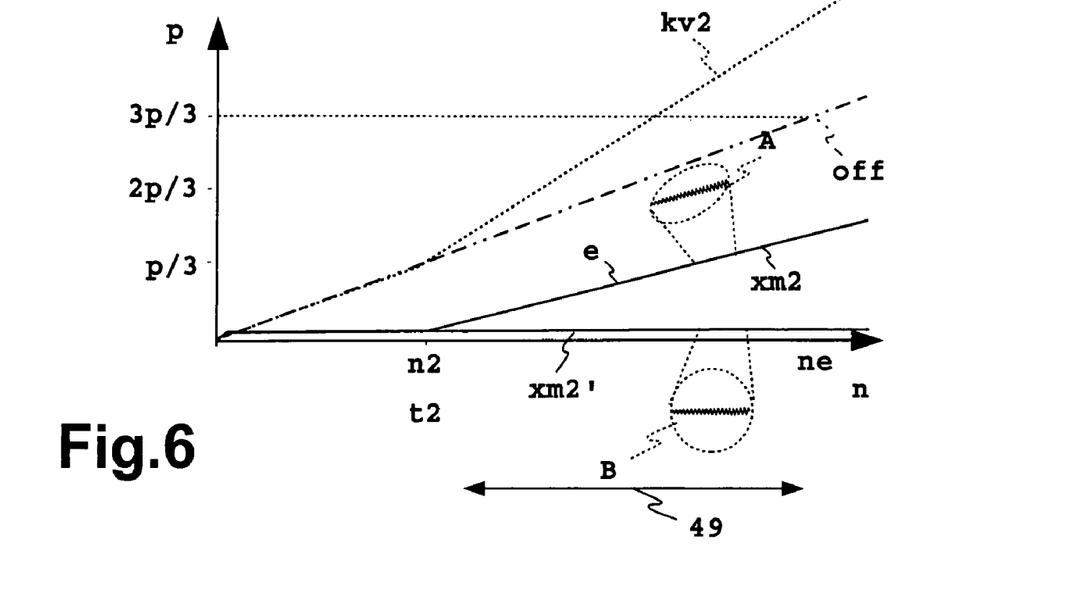
FIG. 6 shows progressions in accordance with FIG. 4a but with a superimposed interfering movement.

Moreover it is possible for external influences, as for example a connected load or the like, to get the armature 14 on the move, while measurement in accordance with the invention of the commutation value is being implemented. If the armature 14 is put on the move, f. i. owing to an external load at a point in time t2 at a count of n2, the position values xm will be increased linearly. The offset values off will be linearly continued as well and added to the position values xm so that the designating commutation offset values kv2 will be produced. This will mean that the external effects, which affect the armature 14, will be taken into account during measurement and the position regulation means 35 will receive corresponding designating commutation offset values kv2.

The position values xm2 oscillate in accordance with the linear progression as shown in FIG. 6 in a manner similar to FIG. 4b. An enlarged section A in FIG. 6 will make the oscillating progression of the position values xm2clear. The analysis means 45 eliminates the modulating influences e from the position values xm2, such values e being optically superimposed on the progression of the position values xm2 in FIG. 6. Owing to the subtraction of the superimposed influence values e, which are f. i. determined as floating mean values of the oscillation, there will be a progression xm2'. It will be seen that at a section B there is the oscillating motion, which is contained in the position values xm2'.

Figure 8A:
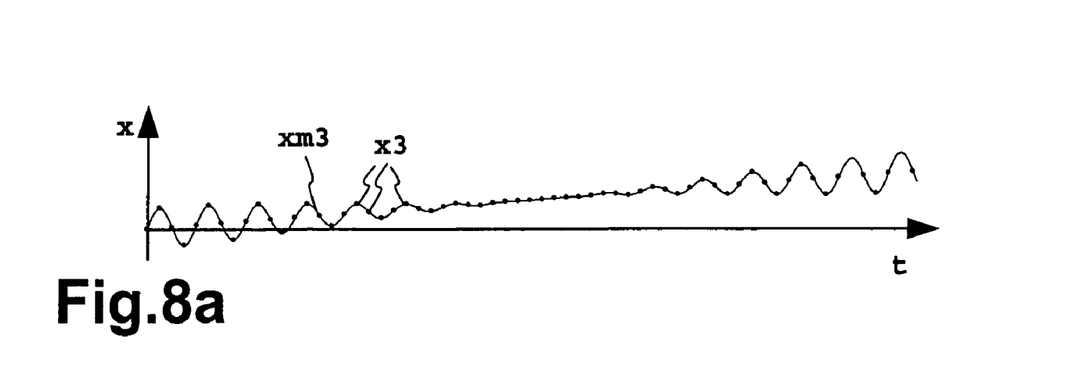
FIG. 8a shows an oscillation function in the case of a superimposed interfering movement.
Figure 8B:
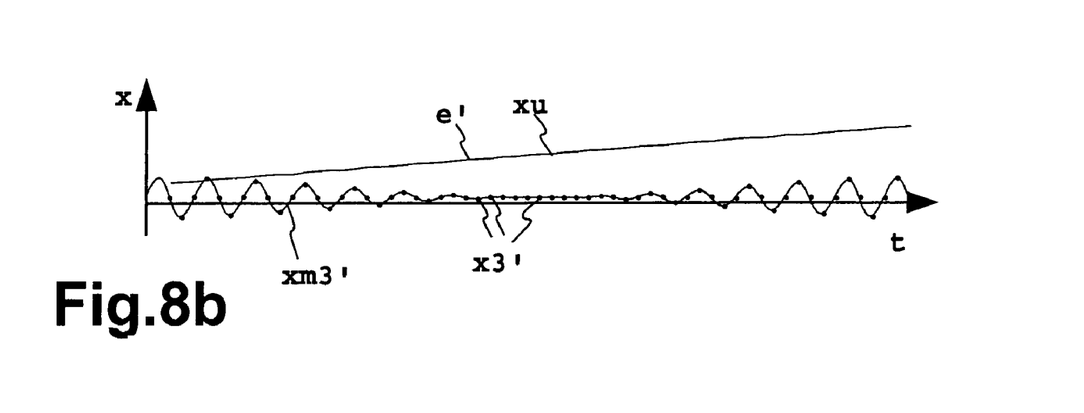
FIG. 8b shows the oscillation function in accordance with FIG. 8a in which the interfering movement is eliminated.

FIG. 8a diagrammatically represents measurement values x3 of an oscillation function xm3 generally in accordance with a section 49 of the oscillation of the position values xm2. The analysis means 45 finds a function e' of modulating influence values xu as a floating mean value function of the oscillation function xm3. The analysis means 45 subtracts the modulating influence values xu from the measured values x3 so that the oscillation function xm3' as represented in FIG. 8b results with values of x3'.

A promising particular design of the invention is such that in the course of performing the above mentioned method the position regulation means 35 limits an oscillation stroke 40 or, respectively, limits an amplitude of the oscillation movement 40, i.e. the resulting oscillation movement, to a limit amplitude ga.

The monitoring means 48 is for example a component of the position regulation means 35, though it could furthermore be a component of the designation means 36, which f. i. monitors the position values xm, xm2 or xm2' for monitoring the limit amplitude ga. The monitoring means 48 for example prevent the armature 14 from performing an uncontrolled change in position in the case of an incorrectly selected commutation offset.

In the plots 4a and 4b the respective progressions are plotted against counter values n. However instead of this it would be possible to plot same against time, f. i. in lieu of counter value axis n a time axis t would be possible.

It is moreover conceivable to have a pneumatic drive in lieu of the guide 18, such drive then aiding the motor 10 during travel and more particularly advantageously being of assistance for halting the force output element 17 at set position. The electric motor 10 would then essentially not have to produce any halting or holding force.

What is claimed is:

1. A method for finding the position of an armature in relation to a stator of a motor, in the case of which the armature is driven by an exciting field which is produced by exciting windings of the stator, and the armature is caused by the exciting field to perform an oscillatory motion, whose progression is detected by a position measuring means for measuring positions of the armature and is evaluated to determine the relative position, the method comprising:

designating a target value signal, applying for an oscillation, to a commutation means for current flow in the exciting windings;

modifying a designating commutation offset value in the commutation means within a value range essentially corresponding to the distance between two adjacent poles of the armature, the designating commutation offset value defining an assumed relative position with reference to at least one exciting winding of the stator;

causing flow of current through the exciting windings on the basis of the respective designating commutation offset value and of the target value signal so that the armature is driven to perform an oscillatory motion corresponding to the target oscillation; and finding at least one actual commutation offset value in the case of which the oscillation amplitude of the oscillation motion is near its maximum.

2. The method as set forth in claim 1, wherein the target value signal defines a target force.

3. The method as set forth in claim 1, wherein the target value signal is a sine or a cosine function.

4. The method as set forth in claim 1, wherein the value range comprises a distance apart of two magnetically like poles of the armature.

5. The method as set forth in claim 1, further comprising finding the at least one actual commutation offset value on the basis of a comparison of the oscillation amplitude of the oscillation movement with a correlation function.

6. The method as set forth in claim 1, further comprising forming the designating commutation offset values on the basis of position values from the position measuring means.

7. The method as set forth in claim 1, wherein the starting designating commutation offset value is a randomly selected designating commutation offset value or a position value determined by the position regulation means at the start of measurement.

8. The method as set forth in claim 1, wherein by incrementally increasing of position values provided by the position regulation means the designating commutation offset values are produced.

9. The method as set forth in claim 1, further comprising eliminating modulating influence values from the position values, the modulating influence values being caused by a movement of the armature, same being modulated on the oscillation movement.

10. The method as set forth in claim 1, further comprising limiting a movement stroke and/or a rotary movement of the motor in the course of measurement by a monitoring means.

11. The method as set forth in claim 1, wherein the amplitude of the oscillation movement is substantially smaller than the distance apart of two adjacent poles of the armature.

12. The method as set forth in claim 1, wherein the amplitude the ratio in the distance apart to the amplitude is between 1000 to 1 and 10000 to 1, and in particular 3000 to 1.

13. The method as set forth in claim 1, further comprising alteration of the frequency and/or the amplitude of the target oscillation.

14. The method as set forth in claim 13, further comprising reduction of the frequency starting with a starting frequency defined by the intrinsic mass of the armature.

15. The method as set forth in claim 13, further comprising reduction of the amplitude starting with a starting amplitude value defined by the intrinsic mass of the armature.

16. The method as set forth in claim 1, further comprising transmission of the at least one actual commutation offset value as a first actual commutation offset value to a position regulation means of the motor and alteration of the first actual commutation offset value by a value equal to half the distance apart of two adjacent magnetically identical poles of the armature and using the first actual commutation offset value, changed to be a second actual commutation offset value, for further position regulation of the motor, when the position regulation means alters a position of the armature on the basis of the first actual commutation offset value by a predetermined value.

17. An electric motor, wherein the armature is driven by an exciting field produced by exciting windings of the stator, comprising a control means for determination of a position of an armature in relation to a stator of the motor, in the case of which for the determination of the relative position the armature is excited by the exciting field to perform an oscillating movement, whose progression is detected by a position measuring means for measurement of the positions of the armature and is evaluated by the control means for determination of the relative position, wherein:

the control means is designed for designation of a target value signal, applying for a target oscillation, to a commutation means for cause flow of current through the exciting windings;

the control means is designed for altering a actual commutation offset value in the commutation means within a value range, which is substantially equal to a distance apart of two adjacent poles of the armature, the designating commutation offset value defining an assumed position in relation to at least one exciting winding of the stator;

the control means is adapted to cause the flow of current through the exciting windings on the basis of the respective designating commutation offset value and of the target value signal so that the armature is driven to perform an oscillation movement corresponding to the target value signal; and the control means is adapted for the determination of at least one actual commutation offset value, at which the amplitude of the oscillation movement is near its maximum.

18. The motor as set forth in claim 17 in the form of a linear drive or a rotary drive.

19. The motor as set forth in claim 17 in the form of a combined electrical and pneumatic drive.

20. The motor as set forth in claim 17, wherein the control means possesses a position regulation means which for determination of the at least one actual commutation offset value receives a target force and position values determined by the position measurement means, such values being incrementally increased within the value range, which corresponds to at least one pitch distance apart between the two adjacent poles of the armature.

* * * * *